United States Patent
Lopez

(10) Patent No.: US 7,703,490 B2
(45) Date of Patent: Apr. 27, 2010

(54) TIRE TREAD WITH ELEMENTS IN RELIEF HAVING INCISIONS AND HOLES

(75) Inventor: José Merino Lopez, Riom (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 538 days.

(21) Appl. No.: 11/599,465

(22) Filed: Nov. 15, 2006

(65) Prior Publication Data
US 2007/0102084 A1 May 10, 2007

Related U.S. Application Data

(63) Continuation of application No. 10/809,850, filed on Mar. 26, 2004, now abandoned, which is a continuation of application No. PCT/EP02/10560, filed on Sep. 20, 2002.

(30) Foreign Application Priority Data

Sep. 27, 2001 (FR) .................. 01 12469

(51) Int. Cl.
B60C 11/117 (2006.01)
B60C 11/12 (2006.01)
(52) U.S. Cl. .................. 152/209.17; 152/209.21; 152/209.23; 152/DIG. 3
(58) Field of Classification Search .......... 152/209.7, 152/209.17, 209.18, 209.21, 209.23, DIG. 3
See application file for complete search history.

(56) References Cited

U.S. PATENT DOCUMENTS

| | | | |
|---|---|---|---|
| 3,848,651 A | 11/1974 | French | |
| 4,298,046 A | 11/1981 | Herbelleau et al. | |
| 4,794,965 A | 1/1989 | Lagnier | |
| 5,176,765 A | 1/1993 | Yamaguchi et al. | |
| 5,783,002 A | 7/1998 | Lagnier | |
| 6,143,223 A | 11/2000 | Lopez | |
| 6,427,738 B1 | 8/2002 | Fujino et al. | |
| 6,564,840 B2 | 5/2003 | Kleinhoff et al. | |
| 6,874,552 B2 | 4/2005 | Lopez | |
| 7,306,019 B2 * | 12/2007 | Kurokawa | 152/209.7 |

FOREIGN PATENT DOCUMENTS

| | | | |
|---|---|---|---|
| EP | 1 033 267 | | 9/2000 |
| EP | 1 123 819 | | 8/2001 |
| EP | 1 125 709 | | 8/2001 |
| FR | 791 250 | | 12/1935 |
| GB | 1 002 317 | | 8/1965 |
| JP | 02-246809 | * | 10/1990 |
| JP | 7-81316 | | 3/1995 |
| JP | 9-164817 | | 6/1997 |
| WO | WO 01/60641 | * | 8/2001 |
| WO | WO 02/083434 | | 10/2002 |

* cited by examiner

*Primary Examiner*—Steven D Maki
(74) *Attorney, Agent, or Firm*—Buchanan Ingersoll & Rooney PC

(57) ABSTRACT

The tread of a tire designed particularly to run on snowy, icy or wet surfaces. The tread comprises elements in relief (e.g., blocks or ribs), each having a running face and lateral faces. At least one element in relief is provided with an incision defined along a mean plane. The tread comprises at least two holes passing through the element in relief substantially parallel to the mean plane of the incision. Each hole opens onto two lateral faces of the element in relief, and the holes are situated on one and the same side of the mean plane of the incision in spaced relationship to the incision.

8 Claims, 2 Drawing Sheets

TIRE TREAD WITH ELEMENTS IN RELIEF HAVING INCISIONS AND HOLES

The present application is a Continuation of U.S. application Ser. No. 10/809,850 filed on Mar. 26, 2004, now abandoned which is a Continuation of International Application PCT/EP02/10560 filed on Sep. 20, 2002, and which claims the priority of patent application Ser. No. 01/12469 filed in France on Sep. 27, 2001, the entire content of which is hereby incorporated by reference.

BACKGROUND OF THE INVENTION

The invention relates to the tread of a tire designed more particularly to run on snowy, icy or wet surfaces.

Such a tread is conventionally provided with elements in relief of the rib or block type, separated from one another in the circumferential direction and/or in the transverse direction by transverse and/or circumferential grooves. The transverse direction is defined as a direction parallel to the axis of rotation of the tire; the transverse direction belongs to a meridian plane. The circumferential direction is perpendicular to the transverse direction and corresponds to the longitudinal direction. The elements in relief are defined by a surface forming part of the surface of the tread and at least one lateral face perpendicular to or oblique relative to the running surface. More generally, the elements in relief comprise at least two faces, the instance of a single face corresponding to elements in relief of rounded section.

Such a tread generally further comprises incisions or slits, the widths of which are other than zero but far less than those of the above-mentioned grooves. By making a plurality of cuts opening onto the running surface, a plurality of rubber ridges is created for cutting through the layer of water which may be present on the road, in such a way as to keep the tire in contact with the ground and to create cavities optionally forming ducts intended to collect and remove the water present in the contact zone between the tire and the road once they are disposed in such a way as to open outside the contact zone.

Numerous types of incision have already been proposed with a view to improving tire grip on the surfaces in question.

French Patent 2,418,719 (corresponding to U.S. Pat. No. 4,298,046) in particular describes incisions which may be normal to the surface of the tread or inclined relative to the direction perpendicular to said surface.

Document FR 791 250 describes incisions following a wavy course over the surface of the tread.

However, it would appear that increasing the number of cuts may lead to a reduction in the rigidity of the tread, which has an unfavorable impact on the performance of the tire, not to say on grip performance. The rigidity of the tread is understood to mean the rigidity of the tread under the combined effect of compressive stresses and shearing forces in the area in contact with the road. It is known, in effect, that to improve the grip of a tire on the surfaces in question, it is necessary to optimize the contact surface, that is to say the latter should be as large as possible. For this purpose, it is necessary to provide flexibility of contact with the ground in a radial direction. On the other hand, it would appear that the loss of rigidity, in the longitudinal direction and optionally in the transverse direction, due to the presence of a large number of cuts has a tendency to reduce this contact surface.

In effect, tipping-over of the elements of the tread pattern is noted, due to shear for example as a result of driving torque or braking torque. This tipping-over causes a reduction in the contact surface, which leads to a reduction in grip.

To remedy this problem associated with loss of rigidity in the longitudinal and possibly transverse directions, it has already been proposed to provide blades of the self-locking type, that is to say blades which rest against one another under radial compression such that longitudinal and transverse rigidities are increased.

Document EP 0 282 765 (corresponding to U.S. Pat. No. 4,794,965) describes in particular incisions which exhibit broken or wavy lines over the entire depth thereof. When subject to radial compression, the walls of the incisions move closer to one another, so promoting an increase in longitudinal rigidity, the overlapping of said walls resulting in a self-locking effect.

French Patent 2,722,144 (corresponding to U.S. Pat. No. 5,783,002) also describes incisions, the walls of which each comprise zones in relief formed by protrusions and cavities designed as before to overlap under radial compression. Overlapping then results in an increase in longitudinal and transverse rigidities.

To optimize the contact surface, it is additionally known to use low modulus rubber mixes, so as to reduce radial rigidity. However, the industrial methods used in the manufacture of semi-finished products limit the choice of rubber mix moduli and do not allow the use of an optimum modulus as far as compressibility is concerned.

SUMMARY OF THE INVENTION

The inventors have therefore made it their objective to produce a tread, comprising incisions, for a tire designed to run on snowy, icy or wet surfaces, whose performance with regard to grip is superior to that of the above-mentioned products and more particularly whose contact surface is optimized and whose longitudinal and transverse rigidities are better than those mentioned above.

This object is achieved according to the invention by a tire tread comprising elements in relief, comprising at least one lateral face, at least one element in relief being provided with at least one incision defined along a mean plane, the tread comprising at least two lateral holes, oriented in a mean direction, passing through said element in relief and substantially parallel to the mean plane of the incision, said holes opening onto at least one lateral face of said element in relief and at least two lateral holes being situated on one and the same side of the mean plane of the incision.

By definition, a lateral hole according to the invention is a hole passing through an element in relief which does not open onto the running surface of said element in relief. In other words, a lateral hole is separated from the running surface by some of the material constituting said element in relief. In the case of tread wear, a lateral hole may become apparent on the surface of the tread, whereupon it is no longer deemed to be a lateral hole for the purposes of the invention. The presence of the lateral holes passing through the elements in relief allows longitudinal deformation to be increased under radial compression, thereby encouraging the walls of the incisions to move closer to one another. This moving together results in said walls resting more rapidly on one another and thus in an increase in longitudinal rigidity, and also in an increase in transverse rigidity.

According to one variant embodiment of the invention, the lateral holes open at each of their ends onto a lateral face of said element in relief. A preferred embodiment of the invention provides for at least two lateral holes to be distributed over the height of the incision.

The element in relief is advantageously provided with at least two incisions defined along mutually parallel mean planes.

According to a preferred embodiment of the invention, the mean direction of the lateral holes forms an angle other than zero with the circumferential direction of the tread. According to this embodiment of the invention, it is possible to produce the tire industrially for example using methods described in document EP 0 925 907. According to this type of method, the lateral holes are formed using needles or fingers which penetrate the tread on the longitudinal faces thereof during curing of the tire. For the purposes of the invention, these needles may additionally be supported and/or guided by the elements used to form the longitudinal grooves.

However, the invention also covers lateral holes whose mean direction is parallel to the circumferential direction of the tread and, for example, lateral holes whose orifices open onto the transverse faces of the blocks.

In a preferred embodiment of the invention, the mean direction of the lateral holes is substantially parallel to the surface of the tread. Such an embodiment will allow new transverse ridges to appear at the surface of the tread during the course of wear thereto, which new ridges will be in addition to those corresponding to the incisions. These new ridges result from the emergence of the lateral holes at the surface of the tread due to wear thereto. These new ridges naturally contribute to the effectiveness of the grip of the tire in the presence of a film of water on the ground.

In a variant embodiment of the invention more particularly adapted to the case of tires intended for use on snowy, icy or wet surfaces, the incisions are defined along a substantially meridian mean plane. Since the role of the incisions is essentially to contribute to breaking the film of water by the presence of their ridges, an arrangement substantially transverse to the direction of travel is best.

According to this variant, the lateral holes according to the invention are then also formed in the transverse direction.

According to an advantageous embodiment of the invention, the sectional area of the lateral holes is between 0.75 and 5 $mm^2$. Such dimensions are compatible in particular with the production methods described above. For smaller dimensions, production would be difficult due to the excessive multiplication of the number of holes which would have to be produced to obtain the desired effect, which would lead to excessive overcrowding of the tools needed to produce said holes. Above these dimensions, the lateral holes could disturb proper functioning of the tire, in particular from the point of view of noise, when they arrive at the surface after wear to the tread.

The lateral holes may exhibit sections of different shapes and in particular either polygonal or elliptical. Preferably, the section of the hole is circular; the deformation of the hole obtained during compression of the tread leads to easier deformation in the transverse direction. Advantageously, the diameter of the section is between 1 and 2.5 mm.

The volume of lateral holes is preferably greater than 20% of the volume of the element in relief.

According to a particularly advantageous embodiment of the invention, the incisions are of the self-locking type. These may for example be incisions such as those mentioned above; these being, for example, incisions exhibiting broken or wavy lines over their entire depth. The incisions may also be of the type whose walls each comprise zones in relief formed by protrusions and cavities or indeed incisions of variable thickness over their height. The combination according to the invention of such incisions with the lateral holes will, by increasing the longitudinal deformation of the tread, increase the movement towards one another of the walls of the incisions whose self-locking effect increases rigidity, the risk of one wall sliding against the other being ruled out.

Preferably also according to the invention, the lateral holes are distributed over a height at least equal to the depth of the incisions. Such an embodiment in particular allows the grip properties obtained according to the invention to be maintained throughout use of the tire, that is to say that the properties obtained according to the invention are maintained despite wear to the tread.

A variant embodiment of the invention provides that, in an element in relief, and between two incisions, the lateral holes are distributed along at least two planes substantially parallel to one another and substantially parallel to the mean planes of the incisions. Such a distribution of the holes will allow the number of incisions to be reduced and consequently tends to improve longitudinal rigidity independently of the increase in compressibility. In effect, as mentioned above, the holes create at the surface of the tread ridges which fulfil a function identical to that of the incisions; it is thus possible to reduce the number of incisions on the tread, the holes replacing them. With the number of incisions being reduced, longitudinal rigidity increases relative to a greater number of incisions.

Also preferably, the lateral holes are offset radially from one column to the other such that said holes are so distributed that they zigzag from one plane to the other. Such an arrangement in particular allows an adequate and virtually constant number of ridges to be maintained on the running surface. Also advantageously, the centers of said lateral holes are spaced in a radial direction from one column to the other by a length less than the sum of the radii of said holes.

DESCRIPTION OF THE DRAWINGS

Other advantageous details and features of the invention will become clear below from the description of examples of embodiment of the invention made with reference to FIGS. 1 to 5, in which.

To simplify understanding thereof, the Figures are not to scale.

DESCRIPTION OF PREFERRED EMBODIMENTS

Figure 1:
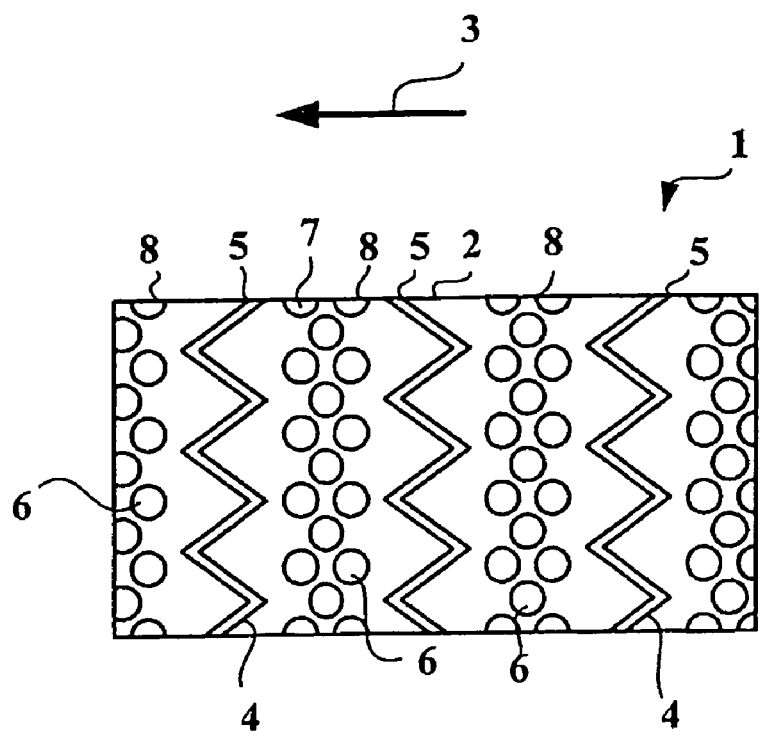
FIG. 1 is a diagram of an elevational view in the transverse direction of the tread of a structural element according to the invention.

FIG. 1 shows part of a structural element in relief or block 1 of the tread of a tire. Only the upper part of said block 1 is shown, the running face or surface 2 corresponding to the tread. Conventionally, such an element in relief or block 1 is delimited by substantially longitudinal grooves and grooves substantially transverse to the direction of travel, that is to say substantially parallel to the axis of rotation of the tire. The function of these longitudinal and transverse grooves is in particular to contain and remove the water which may be present on the ground.

FIG. 1 is a view along the axis of rotation of the tire, that is to say in the direction transverse to the direction of travel shown by the arrow 3. The block 1 comprises incisions 4 over at least part of its height. These incisions are provided in particular to create supplementary ridges 5 on the surface of the tread 2, so as to improve grip of the tire on damp surfaces, said supplementary ridges allowing the film of water on the surface of the ground to be cut through more frequently. The incisions 4 of FIG. 1 are produced by the methods known to the person skilled in the art, so as to form broken (e.g., zigzag) lines, so that one of the side surfaces of the incision includes portions overlying respective portions of the other side surface of the same incision. The invention is not of course limited to such incisions and applies to all types of incisions. The incisions shown have the advantage, however, of being of the self-locking type and of contributing to an increase in longitudinal rigidity. In effect, independently of the invention, it would appear that the geometry of these incisions results in locking of the walls one by the other when they move towards one another due to shearing of the block 1, and thus of the walls of the incisions in the longitudinal direction, when the tire rotates. Other incisions of the self-locking type do exist, for example incisions exhibiting wavy lines over their entire depth. The incisions may also be of the type whose walls each comprise zones in relief formed by protrusions and cavities or indeed incisions of variable thickness over their height. These various types of incision are described in particular in patent applications French Patents No. 2 722 144 and No. 2 804 905 (corresponding to Publication WO 03/029031).

FIG. 1 also shows the lateral holes 6 according to the invention, which pass through the blocks 1 substantially transversely and parallel to the incisions 4 and to the axis of rotation of the tire. The presence of these lateral holes 6 passing transversely through the blocks 1 gives rise to various functions.

Firstly, the lateral holes 6 increase the compressibility of the blocks 1; consequently, when a given zone of the tread is in contact with the ground, forming the contact area, the presence of the lateral holes 6 in the various blocks 1 of said zone permits greater longitudinal deformation of the blocks 1 under the stress due to crushing of said blocks 1 on contact with the ground. It is thus observed that the walls of the incisions 4 move closer to one another, which promotes contact thereof under lower shear than that mentioned above. The longitudinal rigidity of the blocks 1 is thus increased and consequently limits the possible shearing of said blocks 1. The contact area between the ground and the tread is thus optimized, which thereby increases the grip of the tire.

Figure 2:
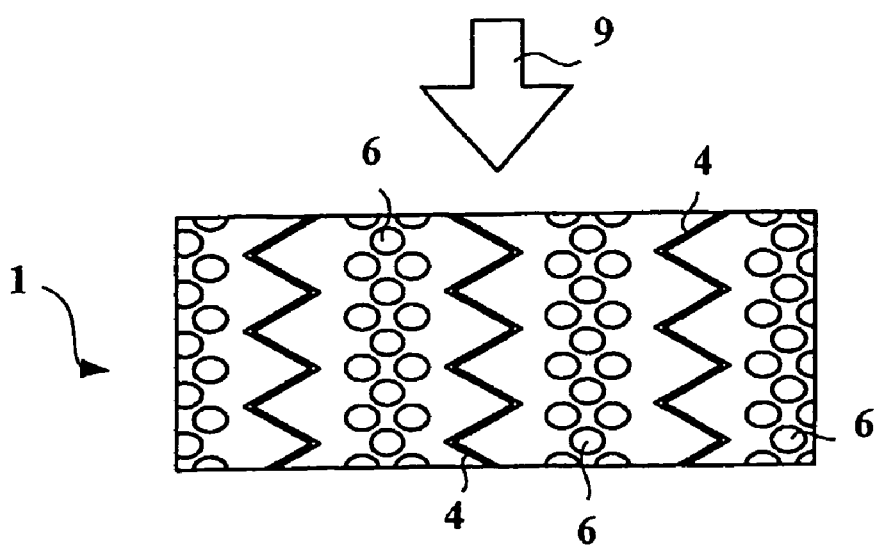
FIG. 2 is a diagram of an elevational view in the transverse direction of the tread of the structural element of FIG. 1 in the compressed state.

FIG. 2 illustrates compression of the tread in contact with the ground by the force, represented by the arrow 9, which comes to bear on the surface 2 of a block 1. The presence of the lateral holes 6 and their deformation allows deformation of the rubber compound which results in the walls of the incisions 4 moving closer together.

The lateral holes 6 are additionally provided, in a selected distribution which will be returned to later, over a height which is substantially equivalent to the depth of the incisions 4, such that the function just mentioned is fulfilled throughout use of the tire, that is to say whatever its state of wear.

Furthermore, wear to the tread results in another function of the lateral holes 6; these finish by appearing at the surface of the tread, such as for example the holes 7 in FIG. 1, and form ridges 8 at the surface of the tread. These ridges 8 are substantially parallel to the ridges 5 formed by the incisions 4 and extend over the entire width of the blocks 1, since the lateral holes 6 pass through said blocks 1 and are substantially parallel to the incisions 4 and to the axis of rotation of the tire. These ridges 8, which have their origin in the wear suffered by the tread, are in addition to the ridges 5 and contribute to the grip performance of the tire. Their presence will in particular allow a reduction in the number of incisions 4 and thus the obtainment of larger gaps between these incisions, thereby permitting a larger number of lateral holes 6 or the option of more widespread distribution of these lateral holes 6.

Furthermore, leaving aside the holes 7, since the lateral holes 6 do not open onto the tread the risk of said lateral holes 6 becoming blocked or clogged by dirt is low. It is thus possible to ensure the permanent functioning thereof.

The last function of the lateral holes 6 relates to manufacture of the tire. The conventional manufacturing methods consist, at the time of curing of the tire, in introducing blades through the tread, said blades having the shape which it is wished to impart to the incision. After curing, said blades are withdrawn with the curing mould, but difficulties often arise, in particular in the case of incisions of the self-locking type, which, as stated above, are of particular interest when combined with the lateral holes according to the invention. In effect, the shapes of the blades of self-locking type require such deformation of the rubber compound that the presence of the lateral holes 6 again becomes an advantage, since they allow this deformation to be obtained without the risk of damage to the tire. In effect, production of these lateral holes requires special tools, such as needles, which penetrate into the rubber compound before curing. Since these tools act on the longitudinal faces of the tread, it is necessary to withdraw them prior to opening of the mould, which is associated with withdrawal of the blades; consequently, the lateral holes are free and allow deformation of the rubber compound at the time of withdrawal of the blades.

In the case of FIGS. 1 and 2, for example, the incisions 6 which form broken lines are in phase opposition with regard to two successive incisions 6 on the block 1. According to the results obtained, such a configuration is particularly advantageous with regard to contributing to an increase in longitudinal rigidity but is very difficult to remove from the mould. The lateral holes 6 will facilitate demolding.

In FIGS. 1 and 2, the lateral holes 6 are distributed between two incisions 4 of the block 1 in three columns oriented radially and thus substantially parallel to the main direction of the incisions, in accordance with an elevational view. The spacing between two lateral holes in one column is the same in all three columns. The position of the lateral holes 6 from one column to another is such that no continuous longitudinal rubber tread remains between two incisions 4 over the space filled with the lateral holes; this distribution allows the avoidance of a localized rubber zone which is virtually undeformable. In other words, this distribution allows the obtainment of substantially homogeneous longitudinal deformation, at the very least sequentially, over the height of the block 1, or more precisely over the height corresponding to the depth of the incisions 4.

Figure 3:
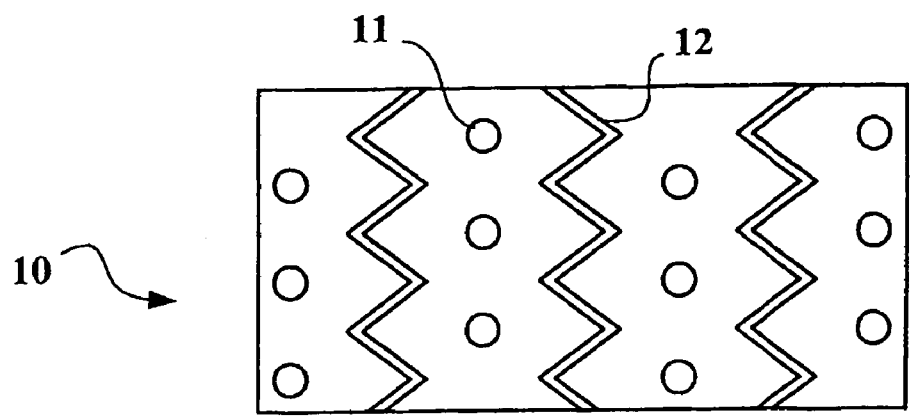
FIG. 3 is a diagram of an elevational view in the transverse direction of the tread of a second structural element according to the invention.
Figure 4:
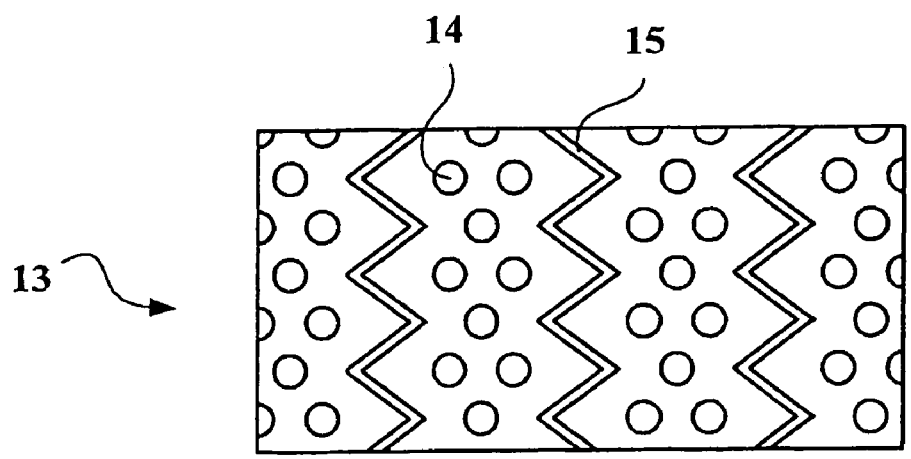
FIG. 4 is a diagram of an elevational view in the transverse direction of the tread of a third structural element according to the invention.

Such a result is not obtained for example with the configuration of FIGS. 3 and 4. In effect, these Figures show zones between two successive incisions without any lateral hole.

FIG. 3 is an elevational view of a longitudinal face of a block 10 and shows a regularly spaced distribution of lateral holes 11 in one column between two incisions 12. On the other hand, this distribution represents a more homogeneous distribution of the lateral holes, that is to say that the relative positions of the lateral holes relative to the incisions are similar throughout. In other words, the influence of the lateral holes 11 on the moving together of the walls of the incisions 12 is always the same for each lateral hole.

FIG. 4, which represents an elevational view of the longitudinal face of a block 13 comprising lateral holes 14 distributed between incisions 15, shows a three-column distribution exhibiting the same characteristics as in FIG. 3. In effect, the distribution of the lateral holes 14 is such that their influence on the walls of the incisions 15 is similar at all the incision levels.

Figure 5:
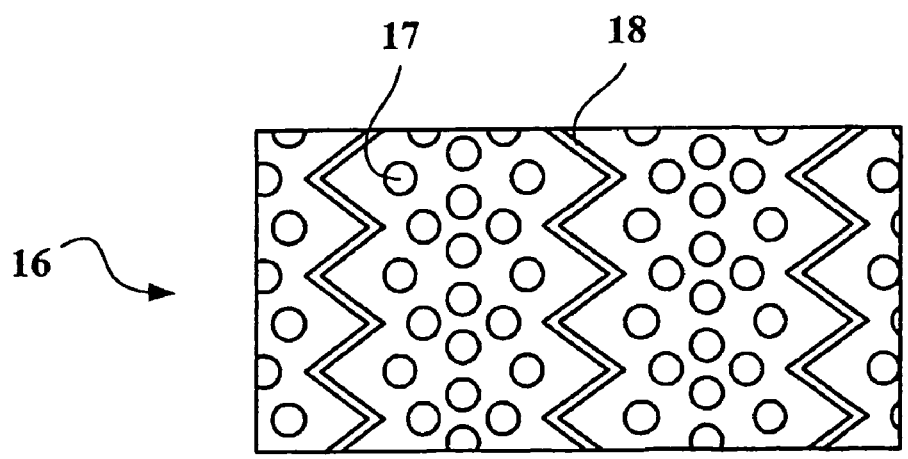
FIG. 5 is a diagram of an elevational view in the transverse direction of the tread of a fourth structural element according to the invention.

FIG. 5 shows a distribution of the lateral holes 17 between the incisions 18 of a block 16 which combines the characteristics of the distributions illustrated in the preceding Figures. The lateral holes are here distributed over five columns, such that, first of all, no continuous rubber zone remains between two incisions 18, as in the case of FIGS. 1 and 2.

Then, as in the case of FIGS. 3 and 4, the influence of the lateral holes on the compressibility of the block 16 and thus on the moving together of the walls of the incisions 18 is similar over the entire depth of said incisions.

These various examples of distribution of the lateral holes in a block comprising incisions, according to the invention, do not have to be viewed as limiting; the number of lateral holes and their distribution will be determined on a case by case basis by the person skilled in the art.

On the other hand, the lateral holes according to the invention are not limited to cylindrical shapes; first of all, as already mentioned above, the section of the lateral holes according to the invention may be of any type. Moreover, the invention provides for lateral holes to be produced which exhibit a helicoidal geometry. Such embodiments of lateral holes are of particular interest when combined with incisions whose walls each comprise zones in relief formed by protrusions and cavities or alternatively incisions of variable thickness over the height thereof. The helicoidal form of the lateral holes will allow the lateral holes to exert a substantially homogeneous influence on the incisions, in the transverse direction of the block or element in relief. From the point of view of manufacture, positioning of the tools giving rise to helically shaped lateral holes is not a problem, the operation being performed prior to curing. As far as withdrawal of these tools after curing is concerned, the invention advantageously provides a motorized mechanism which allows this withdrawal to be performed with rotation of said tools so as not to risk damaging the tire.

The invention thus describes a combination of incisions and lateral through-holes, substantially parallel to the mean plane of said incisions in a structural block or element in relief of the tread of a tire. It shows that this combination is of particular interest with regard to improving the grip of the tires on a surface which for various reasons is damp. First of all, the presence of lateral holes according to the invention allows the compressibility of the tread of the tire to be increased; less deformation of said tread thus occurs as a result of the shearing at the time of contact with the ground and thus said contact surface is increased, which results in an improvement in tire grip. Furthermore, the presence of these lateral holes, advantageously oriented in a direction parallel to the surface of the tread, creates, as a result of wear, new ridges at the surface of the tread which assist the incisions in cutting the film of water present on the surface of the ground and thus in improving tire grip.

The invention claimed is:

1. Tire tread comprising elements in relief, each element in relief comprising a running face and at least two lateral faces, at least one element in relief being provided with two incisions intersecting the running face from one end to the other of each incision when the tread is new, each incision defined along a mean plane, wherein the tread comprises a plurality of holes, oriented in a mean direction, passing through said element in relief substantially parallel to said mean planes and spaced from said incisions, wherein opposite ends of each of the holes open onto respective lateral faces of said element in relief, wherein between the two incisions the holes are distributed along at least a pair of planes which are substantially parallel to one another and parallel to the respective mean planes of the incisions, the holes being distributed alone a region situated between the running surface of the tread and a bottom of at least one of the incisions, the holes arranged such that they zigzag from one of said pair of planes to the other, wherein each incision is defined by two side surfaces, one of the side surfaces having portions thereof overlying respective portions of the other side surface, wherein the incision is self-locking when the portions of the side surfaces are forced together in response to compression of the element in relief.

2. Tread according to claim 1, wherein the mean direction of the holes forms an angle other than zero with the circumferential direction of the tread.

3. Tread according to claim 1, wherein the mean direction of the holes is substantially parallel to the running face of the tread.

4. Tread according to claim 1, wherein the incisions are defined along a substantially meridian mean plane.

5. Tread according to claim 1, wherein the sectional area of the holes is between 0.75 and 5 mm$^2$.

6. Tread according to claim 1, wherein the section of the holes is circular and wherein its diameter is between 1 and 2.5 mm.

7. Tread according to claim 1, wherein the volume of the holes is greater than 20% of the volume of the element in relief.

8. Tread according to claim 1, wherein the holes are distributed over a height at least equal to the depth of at least one incision.

* * * * *